United States Patent
Cottereau et al.

(10) Patent No.: US 10,989,446 B2
(45) Date of Patent: Apr. 27, 2021

(54) COOLING DEVICE INTENDED TO EQUIP AN INFRARED VISION DEVICE WITH A DEFORMABLE ELEMENT

(71) Applicant: SAFRAN ELECTRONICS & DEFENSE, Boulogne-Billancourt (FR)

(72) Inventors: Bertrand Cottereau, Boulogne-Billancourt (FR); Nicolas Duval, Boulogne-Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 0 days.

(21) Appl. No.: 16/627,251

(22) PCT Filed: Jun. 29, 2018

(86) PCT No.: PCT/EP2018/067627
§ 371 (c)(1),
(2) Date: Dec. 27, 2019

(87) PCT Pub. No.: WO2019/002570
PCT Pub. Date: Jan. 3, 2019

(65) Prior Publication Data
US 2020/0132342 A1     Apr. 30, 2020

(30) Foreign Application Priority Data
Jun. 30, 2017   (FR) ...................................... 1756194

(51) Int. Cl.
*F25B 9/14*       (2006.01)
*G01J 5/06*      (2006.01)
(Continued)

(52) U.S. Cl.
CPC ................ *F25B 9/14* (2013.01); *F02G 1/053* (2013.01); *F16C 7/08* (2013.01); *F16J 7/00* (2013.01);
(Continued)

(58) Field of Classification Search
CPC ............. F02G 2270/42; F02G 2270/45; F02G 2270/85; F16J 7/00; F01B 9/00–04; F16C 7/06; F16C 7/08
See application file for complete search history.

(56) References Cited

U.S. PATENT DOCUMENTS

2007/0261407 A1   11/2007   Bin-Nun et al.
2012/0256088 A1   10/2012   Balonek et al.
(Continued)

FOREIGN PATENT DOCUMENTS

| DE | 102014114146 A1 * | 3/2016 | ............. F16C 7/026 |
| EP | 0339836 | 11/1989 | |
| EP | 0471887 A1 * | 2/1992 | ............. G04B 1/124 |
| EP | 0778452 A1 * | 6/1997 | ............. F02G 1/043 |

(Continued)

OTHER PUBLICATIONS

"International search report," Application No. PCT/EP2018/067,627 (dated Jul. 25, 2018).
(Continued)

*Primary Examiner* — Laert Dounis
(74) *Attorney, Agent, or Firm* — Womble Bond Dickinson (US) LLP

(57) ABSTRACT

The present invention relates to a cooling device (8) comprising: —a housing (22); —a crank (28) rotationally movable relative to the housing (22); —a piston (16); —a coupling component (34) rotationally mounted on the crank (28), the coupling component (34) having a first edge (54) facing the piston (16) and a second edge (56) opposite the first edge (54); —a deformable element (64) integrated in the coupling component (34) and integrated in the piston (16), the deformable element (64) being configured to translationally move the piston (16) relative to the housing while deforming, when the crank (28) is rotated relative to the housing (22), the deformable element (64) being integrated in the second edge (56) of the coupling component (34).

16 Claims, 10 Drawing Sheets

(51) Int. Cl.
*G02B 23/12* (2006.01)
*F02G 1/053* (2006.01)
*F16J 7/00* (2006.01)
*F16C 7/08* (2006.01)

(52) U.S. Cl.
CPC .............. *G01J 5/061* (2013.01); *G02B 23/12* (2013.01); *F02G 2243/34* (2013.01); *F02G 2270/40* (2013.01); *F02G 2270/42* (2013.01); *F02G 2270/45* (2013.01); *F02G 2270/85* (2013.01)

(56) References Cited

U.S. PATENT DOCUMENTS

2013/0031915 A1* 2/2013 Bin-Nun .................. F25B 9/14
62/6
2014/0041620 A1* 2/2014 Henriques, Jr. ........... F16C 7/04
123/197.3

FOREIGN PATENT DOCUMENTS

| FR | 812116 A * | 4/1937 | ............... F16C 7/08 |
| FR | 2944416 | 10/2010 | |
| FR | 3033630 A1 * | 9/2016 | ............... F25B 9/14 |
| WO | WO-2004055370 A2 * | 7/2004 | ......... G04B 27/0882 |

OTHER PUBLICATIONS

"Written Opinion of the ISA," Application No. PCT/EP2018/067627 (dated Jul. 25, 2018).

\* cited by examiner

FIG. 6
FIG. 7
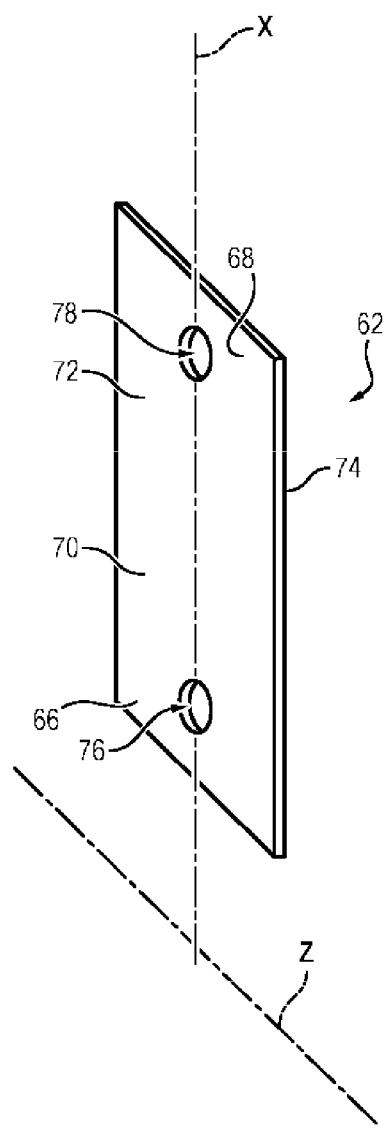
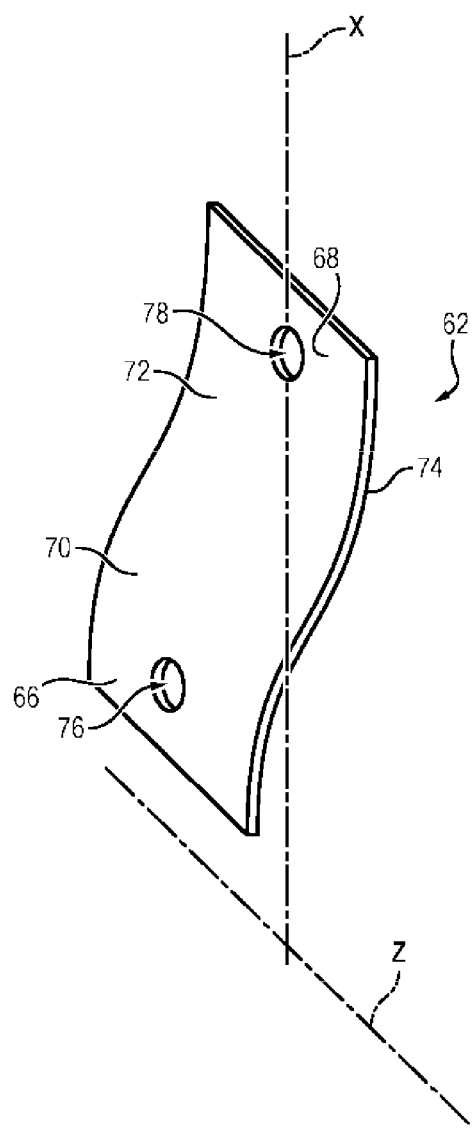

COOLING DEVICE INTENDED TO EQUIP AN INFRARED VISION DEVICE WITH A DEFORMABLE ELEMENT

FIELD OF THE INVENTION

The present invention relates to a cooling device.
This cooling device advantageously finds application in an infrared vision device.

STATE OF THE ART

Infrared vision equipment, such as binoculars, that allows viewing targets at night or through fumes, is known.

Such infrared vision equipment comprises an infrared detector and a cooling device (also called cold machine or micro-cooler), ensuring the cooling of the infrared detector at a temperature typically in the order of 80 degrees Kelvin.

A cooling device for known infrared vision equipment, of the Stirling alpha type, comprises a casing, a crank movable in rotation relative to the casing, a coupling member mounted in rotation on the crank, and two pistons: a gas compression piston, conventionally called "hot" piston, and a regenerator piston, conventionally called "cold" piston as opposed to the hot piston.

A transformation of a continuous rotational movement of the crank relative to the casing into a reciprocating translational movement of each of the two pistons relative to the casing is implemented by means of two connecting rods. Each connecting rod is mounted in rotation on the coupling part on the one hand and one of the pistons on the other hand, so as to form a conventional connecting rod-crank system.

However, the connecting rods have the disadvantage of causing a significant phonic noise in the infrared vision equipment. This noise is caused by vibrations generated by clearance compensation impacts at the two pivot links that each connecting rod forms, on the one hand, with one of the two pistons and, on the other hand, with the coupling member, when force directions change. This noise is unpleasant for a user of the infrared vision equipment. In addition, infrared vision equipment is often intended to be used in missions requiring great discretion. However, a user of the infrared vision equipment could be identified because of the significant phonic noise caused by the connecting rod of this equipment. To avoid this phonic noise problem, it is necessary to reduce the clearances of the pivot links to a few microns. This, however, increases the manufacturing cost of the cooling device.

Another disadvantage of the connecting rod is that the two pivot links can wear or seize up. To avoid these problems, it is necessary to perfectly master the tribology parameters relating to the connecting rod and the two parts on which it is mounted in rotation to form the two pivot links (lubrication, hardness, surface condition, etc.). However, these requirements cannot be fulfilled without increasing the manufacturing cost of the cooling device.

To overcome these problems without increasing the manufacturing cost of the cooling device, it has been proposed to replace the connecting rod displacing the compression piston with a deformable element. The deformable element is embedded, on the one hand, in the piston and, on the other hand, in an edge of the coupling member which is facing the piston. The deformable element extends in its entirety between the coupling member and the compression piston. When the crank is continuously rotated relative to the casing, the deformable element transmits to the piston, while deforming, the reciprocating translational movement undergone by the coupling member. By replacing one of the connecting rods with the deformable element, at least one pivot link generating phonic noise is removed from the cooling device.

However, a cooling device for infrared vision equipment must be as compact as possible. To meet this requirement of compactness, the distance between the piston and the coupling member is small compared to the stroke of the piston. This has the consequence that the deformable element which extends between the piston and this member is strongly flexurally biased during a turn of the crank, thereby causing significant fatigue.

It has been proposed in document FR3033630 to fasten a deformable element not to a first edge of the coupling member which is facing the piston, but to a second opposite edge of the coupling member which is opposite the first edge. This second edge is further from the piston than the first edge. As a result, the deformable element is longer than if it were embedded in the first edge of the coupling member. Thanks to this extra length, the deformable element is comparatively less likely to bend during a turn of the crank. And since the deformable element is less flexurally biased, its fatigue is reduced. This excess length of the deformable element is obtained without having to increase the distance between the piston and the crank. The dimension of the cooling device parallel to the axis of translation of the piston is therefore not significantly increased.

However, the deformable element described in document FR3033630 is L-shaped. This L-shape necessarily leads to an offset of the piston displaced by this deformable element relative to the coupling member, and thus an offset of the central axis of the piston with respect to the axis of rotation of the crank. This has the disadvantage of having to change the shape of the casing and require a significant increase in the dimension of the device along a direction perpendicular to the axis of translation of this piston.

DISCLOSURE OF THE INVENTION

An object of the invention is to propose a cooling device more resistant to wear, while being inexpensive to manufacture, and generating a reduced phonic noise without significantly increasing its bulk.

It is thus proposed, according to a first aspect of the invention, a cooling device comprising:
 a casing,
 a crank movable in rotation relative to the casing,
 a piston,
 a coupling member mounted in rotation on the crank, the coupling member having a first edge facing the piston and a second edge opposite the first edge,
 a deformable element embedded in the coupling member and embedded in the piston, the deformable element being configured to move the piston in translation relative to the casing while deforming, when the crank is rotated relative to the casing, the deformable element being embedded in the second edge of the coupling member.

As the first edge of the coupling member is facing the piston and the second edge is opposite the first edge, the second edge is further from the piston than the first edge. As a result, the deformable element is longer than if it were embedded in the first side of the coupling member, as proposed in the state of the art. Thanks to this extra length, the deformable element is comparatively less bent during a turn of the crank. And since the deformable element is less flexurally biased, its fatigue is reduced. This excess length of the deformable element is obtained without having to increase the distance between the piston and the crank. The dimension of the cooling device parallel to the axis of translation of the piston is therefore not significantly increased.

In addition, the deformable element comprises:
a first portion extending along the second edge of the member parallel to an axis of rotation of the crank,
a second portion lengthening the first portion and extending toward the piston,
a third portion lengthening the second portion and extending parallel to the axis of rotation of the crank, so that the three portions form a U overlapping the coupling member.

This particular shape of deformable element has the advantage of not requiring a significant increase in a dimension of the cooling device along a direction perpendicular to the axis of translation of the piston.

Another advantage provided by this particular shape of deformable element is that it is easily adaptable to existing cooling devices in which the axis of translation of the piston and the axis of rotation of the crank are coplanar.

The cooling device may further comprise the following optional characteristics, taken alone or in combination when technically possible.

The deformable element may have a shape adapted to bypass the coupling member without touching the first edge during the rotation of the crank relative to the casing.

It can further be provided that:
the crank comprises a drive shaft and a crankpin that is eccentric relative to the drive shaft,
the coupling member is mounted in rotation on the crankpin, and is located between the second portion of the coupling member and the drive shaft.

The deformable element may have a rounding and/or a fillet in at least one junction between two of the portions.

The crank may comprise a crankpin, and the coupling member comprises a first wall in which the first edge is formed and a second wall in which the second edge is formed, the crankpin being arranged between the two walls.

The deformable element can be made of metal.

The deformable element may be a sheet metal or even a multi-size blue sheet metal.

The deformable element may comprise an end portion having a first orifice, and the piston may have: a groove for receiving the end portion, two orifices opening into the groove and arranged to be aligned with the first orifice, and a pin passed through the three aligned orifices to embed the deformable element in the piston.

The cooling device may further comprise
a nut formed in the coupling member,
a screw adapted to cooperate with the deformable element and the nut so as to embed the deformable element in the coupling member.

Furthermore, the casing may define a cavity housing the coupling member, and further has an access passage to the cavity, and the nut may be oriented facing the access passage so that the screw can be screwed into the nut by means of a screwing tool introduced into the cavity via the access passage.

The cooling device may be of the Stirling alpha type, in which case the piston may be a cold piston of the cooling device.

The cooling device may further comprise:
a second piston,
a second deformable element embedded in the coupling member and embedded in the second piston, the second deformable element being configured to move the second piston in translation relative to the casing while deforming, when the crank is rotated relative to the casing.

The coupling member may also have a third edge facing the second piston, wherein the second deformable element is embedded in the third edge of the coupling member.

When the cooling device is of the Stirling alpha type, the second piston may be a hot piston of the cooling device.

The cooling device may be particularly intended to be embedded in an infrared vision device.

According to a second aspect of the invention, an infrared vision device, for example binoculars, is proposed, comprising a cooling device according to the first aspect of the invention.

DESCRIPTION OF THE FIGURES

Other characteristics, objects and advantages of the invention will become apparent from the following description which is purely illustrative and non-limiting and which should be read with reference to the appended drawings in which:

FIGS. 6 and 7 are two perspective views of a first deformable element of the cooling device according to the first embodiment, respectively in an undeformed state and in a deformed state.

In all the figures, the similar elements bear identical references.

DETAILED DESCRIPTION OF THE INVENTION

Figure 1:
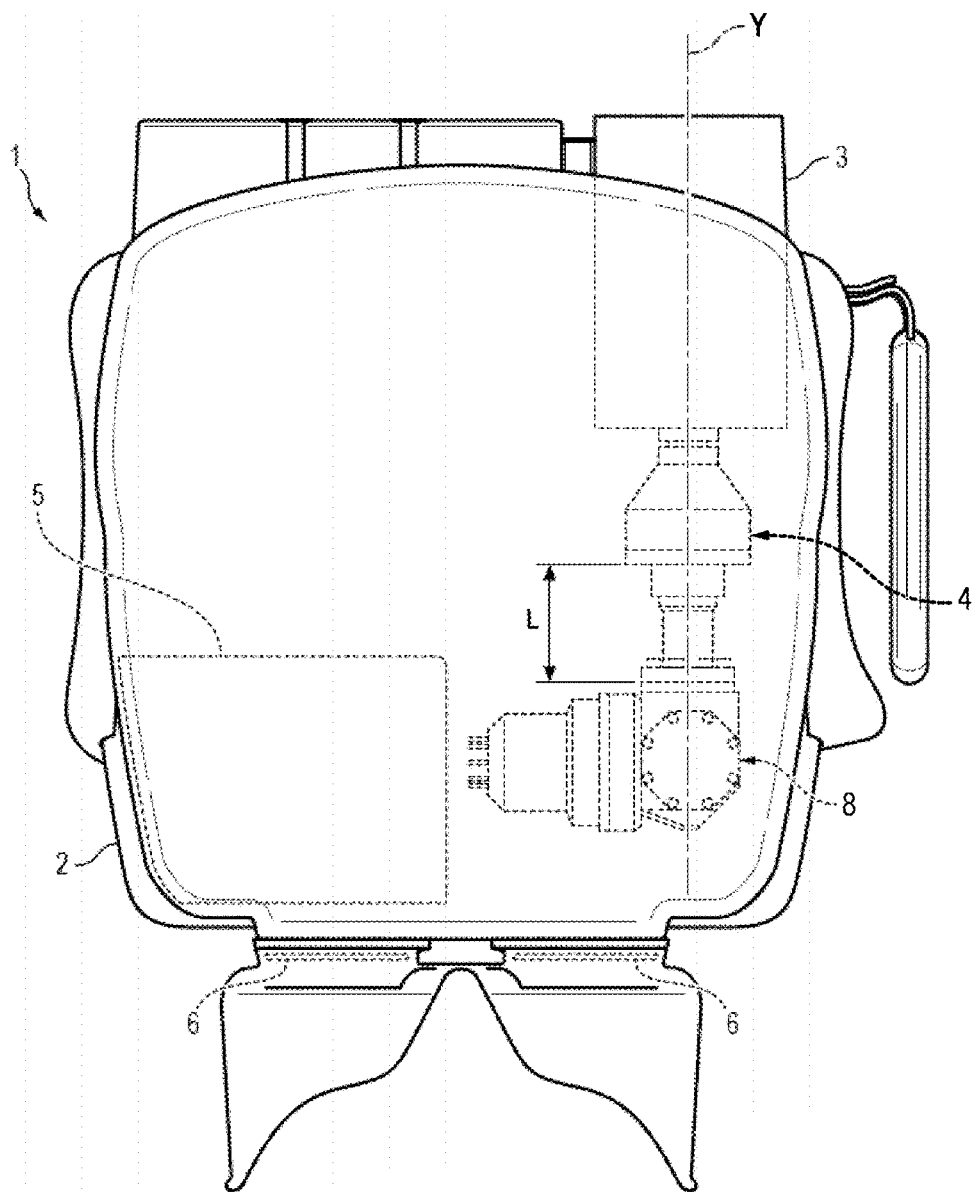
FIG. 1 is a schematic view of infrared vision binoculars, according to one embodiment of the invention.

FIG. 1 schematically represents infrared vision binoculars 1. The binoculars 1 comprise a casing 2, an optical system 3, an infrared detector 4, a processing module 5 and two display screens 6. The optical system has an optical axis Y. The optical system 3 is arranged to transmit infrared radiation emitted by a target to the detection module 4. The detection module 4 converts the received infrared radiation into a detection signal which is transmitted to the processing module 5. The processing module 5 controls the display of an image on the display screens 6 to allow a user to view the target. For this purpose, the user positions his eyes in front of the display screens 6.

The binoculars furthermore comprise a cooling device 8. In the present text, the term "cooling device" is to be interpreted as any thermal machine configured to produce cold (such as a cold machine, a cooler, a micro-cooler, etc.) The function of the cooling device is to maintain the temperature of the infrared detector, at a very low temperature, in the order of 80 degrees Kelvin.

Figure 2:
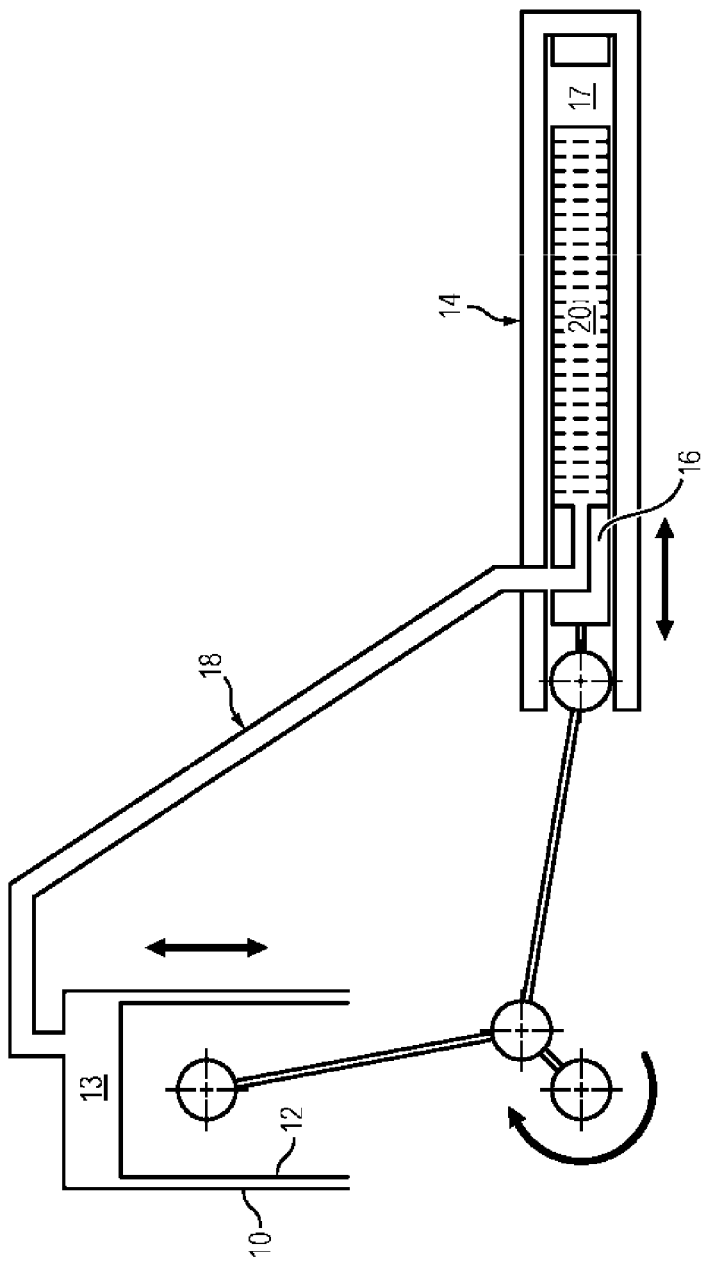
FIG. 2 is a partial sectional view of a cooling device, according to one embodiment of the invention.

Referring to FIG. 2, the cooling device 8 according to a first embodiment comprises a compression cylinder 10 having a central axis X, and a compression piston 12 movable in translation along the axis X in the compression cylinder 10. The compression chamber 13 is defined by the compression cylinder 10 and the compression piston 12.

The compression piston 12 has the function, when it is displaced in translation, of compressing or expanding a gas in the compression chamber 13.

The cooling device 8 further comprises a regeneration cylinder 14 having as a central axis the axis Y and a regenerator piston 16 movable in translation along the axis Y in the regeneration cylinder 14. The regeneration cylinder 14 is for example formed in a cold finger.

The optical system 3, the detector 4 and the cold finger 14 are coaxial and arranged in this order along the axis Y.

The expansion chamber 17 is defined by the regeneration cylinder 14 and the regenerator piston 16. The regenerator piston 16 has the function, when it is displaced in translation in the cylinder, of compressing or expanding a gas in the expansion chamber 17.

The cooling device 8 comprises a pipe 18 connecting the compression chamber 13 to the expansion chamber 17.

The cooling device 8 furthermore comprises a regenerator 20, arranged in the expansion chamber 17. The regenerator 20 is a hollow body adapted to store part of the heat energy of a gas which passes therethrough, when the compression piston 12 compresses the gas in the compression chamber 13 and then to restitute this energy during a gas expansion in the expansion chamber 17, caused by a displacement of the regenerator piston 16.

The regenerator piston 16 is fastened to regenerator 20, or forms part of the regenerator 20.

The cooling device 8 is of the Stirling alpha type. As a reminder, a Stirling cycle comprises four phases:

An isothermal compression phase, during which gas in the compression chamber 13 is compressed by the compression piston 12 moving away from the central cavity.

An isochoric cooling phase, during which the compressed gas is transferred from the compression chamber 13 toward the expansion chamber 17 via the pipe 18. The gas releases part of its heat energy to the regenerator 20, when passing therethrough. The temperature drop which is then caused leads to a pressure drop.

An isothermal expansion phase, during which is generated by a displacement of the regenerator piston 16 toward the central cavity. The pressure drop causes the cooling of the gas contained in the expansion chamber 17.

An isochoric heating phase, during which the gas passes from the expansion chamber 17 to the compression chamber 13, via the pipe 18. While passing through the regenerator 20, the gas recovers the heat it has released during the isochoric cooling phase.

The compression piston 12 is called "hot" piston and the regenerator piston is called "cold" piston. These two names, well known to those skilled in the art, refer to the fact that the gas in the compression chamber 13 is hotter than in the expansion chamber 17.

the means for displacing the pistons 12 and 16 which allow implementing this Stirling cycle will now be detailed.

Figure 3:
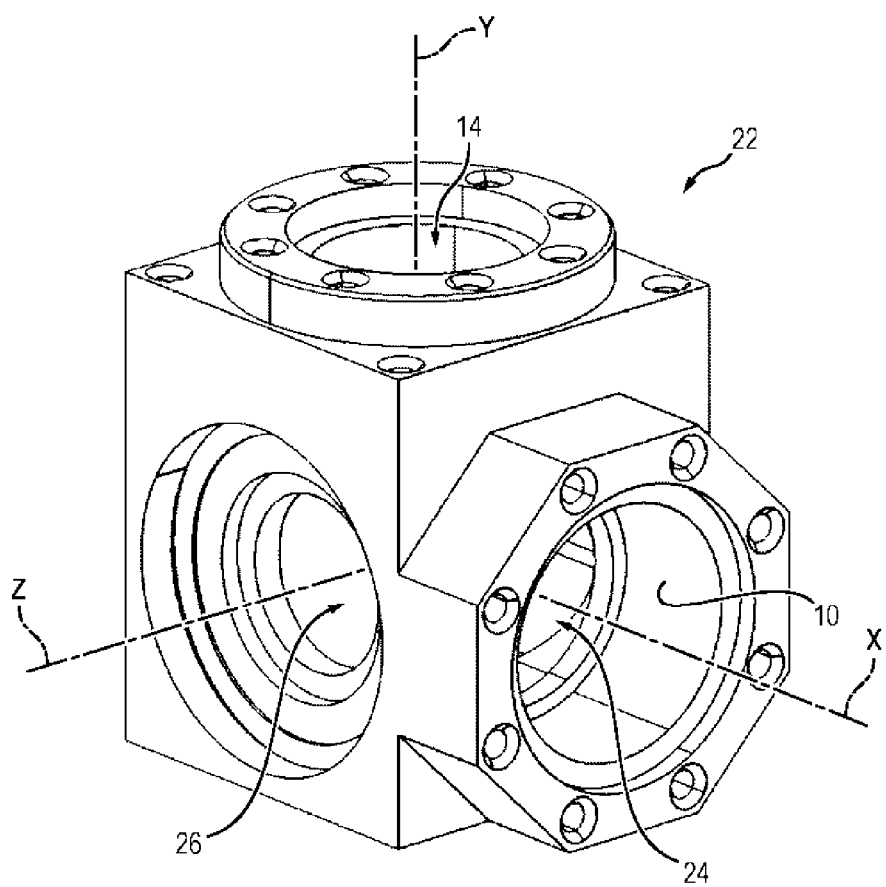
FIG. 3 is a perspective view of a casing of a cooling device according to one embodiment of the invention.

With reference to FIG. 3, the cooling device 8 comprises a casing 22 defining a central cavity 24.

The compression cylinder 10 opens into the central cavity 24. The compression cylinder 10 is at least partly formed by the casing 22. Similarly, the regeneration cylinder 14 opens into the central cavity 24, and is partly formed by the casing 22.

In contrast, the pipe 18 connects the compression chamber 13 to the expansion chamber 17 without passing through the central cavity 24.

The casing 22 defines an access passage 26 at the central cavity 24, which extends along a third axis Z. The axes X, Y, Z are orthogonal two by two. They pass through the same central point which is in the central cavity defined by the casing 22.

Figure 4:
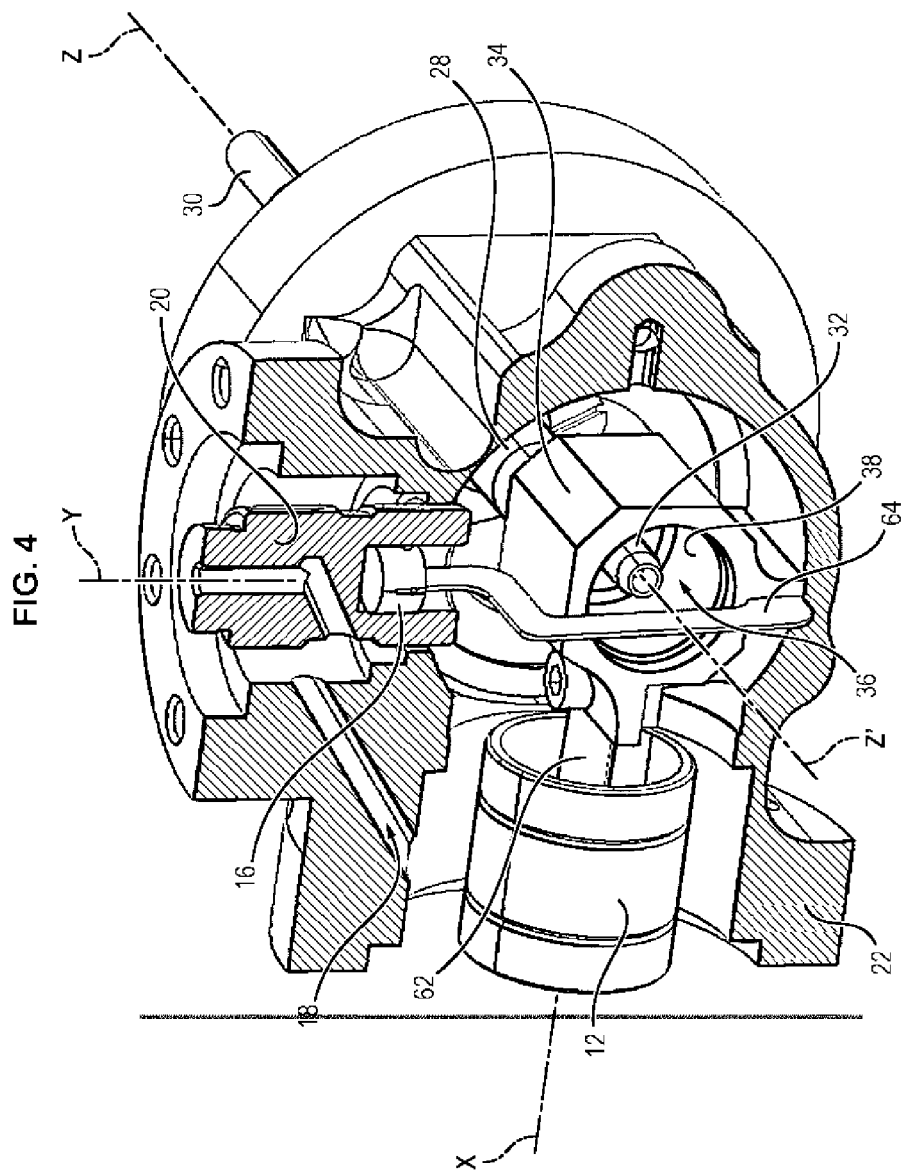
FIG. 4 is a partial sectional perspective view of a cooling device according to a first embodiment of the invention.

Referring to FIG. 4, the cooling device 8 comprises a crank 28 configured to be driven in rotation about the axis Z.

The crank 28 is driven in rotation by a motor, for example an electric motor (not represented in the figures). The motor is typically arranged outside the central cavity 24, in a portion of the generator between the processing module 5 and the central cavity 24, this portion being visible in FIG. 1.

The crank 28 comprises a drive shaft 30 extending into the access passage 26 at the central cavity 24.

A first end of the drive shaft 30 is mounted in rotation on the motor. A second end of the drive shaft 30, opposite the first end, extends into or in the vicinity of the central cavity 24.

The drive shaft 30 is movable in rotation about the axis Z. The drive shaft 30 has, for example, a circular end surface.

The crank 28 further comprises a crankpin 32 fastened to the end of the drive shaft closest to the central cavity 24. The crankpin 32 has a shape of revolution about an axis Z' parallel to the axis Z, but at a distance therefrom. The crankpin 32 is therefore caused to move in orbit about the axis Z, during the rotation of the drive shaft 30.

The crankpin 32 is in the central cavity 24. The crankpin 32 has a typically cylindrical outer surface of revolution.

The cooling device 8 further comprises a coupling member 34 mounted in rotation on the crank 28.

More specifically, the coupling member is mounted in rotation on the crankpin 32 of the crank 28 about the axis Z'.

The coupling member 34 has a radially inner surface 36. The radially inner surface 36 defines an inner space in which the crankpin 32 is received. The coupling member 34 therefore extends about the axis of the crankpin 32.

The inner diameter of the radially inner surface 36 of the coupling member 34 is larger than the outer diameter of the crankpin 32, so that an annular gap 38 is formed between the outer surface of the crankpin 32 and the inner surface 36 of the member 34.

Figure 5:
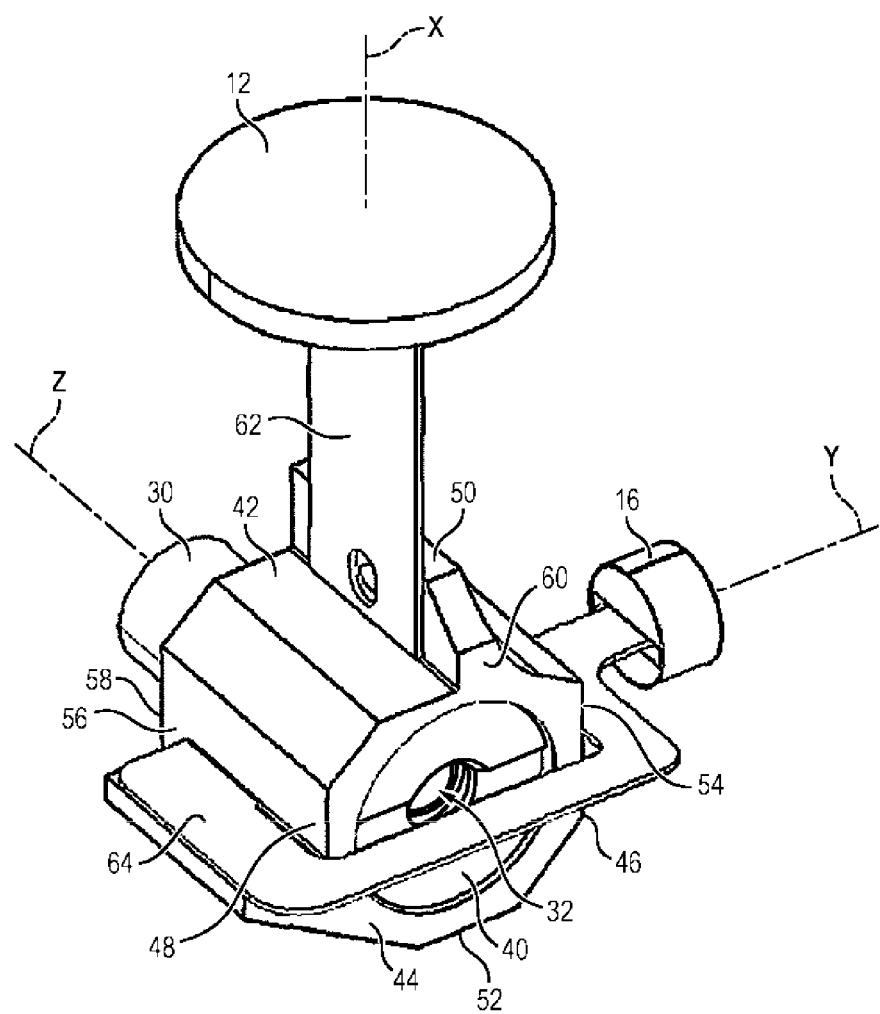
FIG. 5 is a perspective view of some parts of the cooling device according to the first embodiment.

With reference to FIG. 5, a ball bearing system 40 is arranged in this annular gap 38.

The coupling member 34 comprises a first wall 42 and a second wall 44. The crankpin 32 extends between the first wall 42 and the second wall 44.

The coupling member 34 further comprises a third wall 46 and a fourth wall 48. The crankpin 32 extends between the third wall 46 and the fourth wall 48.

The third wall 46 and the fourth wall 48 each connect the first wall 42 to the second wall 44. In other words, the four walls 42, 44, 46, 48 together surround the crankpin 32 about its axis Z'.

The coupling member 34 comprises a first free edge 50 facing the compression piston 12, and a second free edge 52 opposite the first edge 50 relative to the crankpin 32. The first free edge 50 is formed in the first wall 42, and the second free edge 52 is formed in the second wall 44.

The coupling member 34 comprises a third edge 54 facing the regenerator piston 16, and a fourth edge 56 opposite the third edge 54 relative to the crankpin 32. The third free edge 54 is formed in the third wall 46, and the fourth free edge 56 is formed in the fourth wall 48.

The third free edge 54 and the fourth free edge 56 each connect the first edge 50 to the second edge 52.

The four free edges 50, 52, 54, 56 together form a portion of the outer surface of the coupling member 34, closed on itself and extending around the crankpin 32. The four edges 50, 52, 54, 56 define four sides of the coupling member 34 viewed in a sectional plane perpendicular to the drive axis Z.

The coupling member 34 further has a fifth edge 58 facing the drive shaft 30, and a sixth edge 60 opposite the fifth edge 58.

The fifth edge 58 and the sixth edge 60 each connect the inner surface to the outer surface of the coupling member 34.

The cooling device comprises a first deformable element 62 configured to transmit to the compression piston 12, while deforming, a reciprocating translational movement undergone by the coupling member 34 when the crank 28 is continuously rotated relative to the casing 22 about the axis Z.

The cooling device further comprises a second deformable element 64 configured to transmit to the regenerator piston 16, while deforming, a reciprocating translational movement undergone by the coupling member 34 when the crank 28 is continuously rotated relative to the casing 22.

Referring to FIGS. 6 and 7, the first deformable element 62 has a first end portion 66 embedded in the coupling member 34, and a second end portion 68 opposite the first end portion 66, embedded in the compression piston 12.

The first deformable element 62 further has an intermediate portion 70 connecting the first end portion 66 to the second end portion 68.

The first deformable element 62 is a sheet metal. By sheet metal is meant in the present text that the first deformable element 62 has a thin thickness compared to its length and width.

In an undeformed configuration, the first deformable element 62 is substantially flat.

The first deformable element 62 has two opposite faces 72 and 74, the thickness of the first deformable element 62 being measured perpendicular to the two faces.

In an undeformed configuration, the two opposite faces 72 and 74 are flat. The first deformable element 62 then has a rectilinear profile in a plane perpendicular to the two planar faces (to the nearest thickness of the first deformable element 62).

The two planar faces 72, 74 are rectangular.

A first orifice 76 is formed in the first end portion 66, and a second orifice 78 is formed in the second end portion 68. The two orifices 76, 78 open into each of the two opposite faces 72 and 74.

The first deformable element 62 is embedded in the compression piston 12 and in the coupling member 34 so that there is at least one position of the coupling member 34 relative to the casing 22, during a turn of the crank 28, in which the first deformable element 62 is in its undeformed configuration.

More specifically, as represented in FIG. 6, the first deformable element 62 is embedded in the compression piston 12 and in the outer surface of the coupling member 34 in positions adapted so that the first deformable element 62 can be traversed over its entire length by the plane formed by the drive axis Z and the compression axis X (thus flexurally undeformed) when:

the crankpin 32 occupies a position closest to the compression piston 12 during a turn of the crank 28,
the crankpin 32 occupies a position farthest from the compression piston 12 during a turn of the crank 28.

The first deformable element 62 is of flexibility adapted to allow it to adopt an S-shaped profile in a plane perpendicular to the drive axis, when the axis of the crankpin 32 is not in the plane defined by the drive axis Z and the compression axis X, as visible in FIG. 7.

Nevertheless, the first deformable element 62 has an axial stiffness (measured parallel to the axis X) adapted to allow it to transmit a reciprocating translational movement of the crankpin 32 to the compression piston 12, even when it is deformed and when it has this S-shape.

It is only to the first edge 50 of the coupling member 34 (facing the compression piston 12) that the first end portion of the first deformable element 62 is fastened. The first deformable element 62 is located between the compression piston 12 and the crankpin 32 of the crank 28, whatever the position of the crankpin 32 relative to the casing 22.

Figure 8:
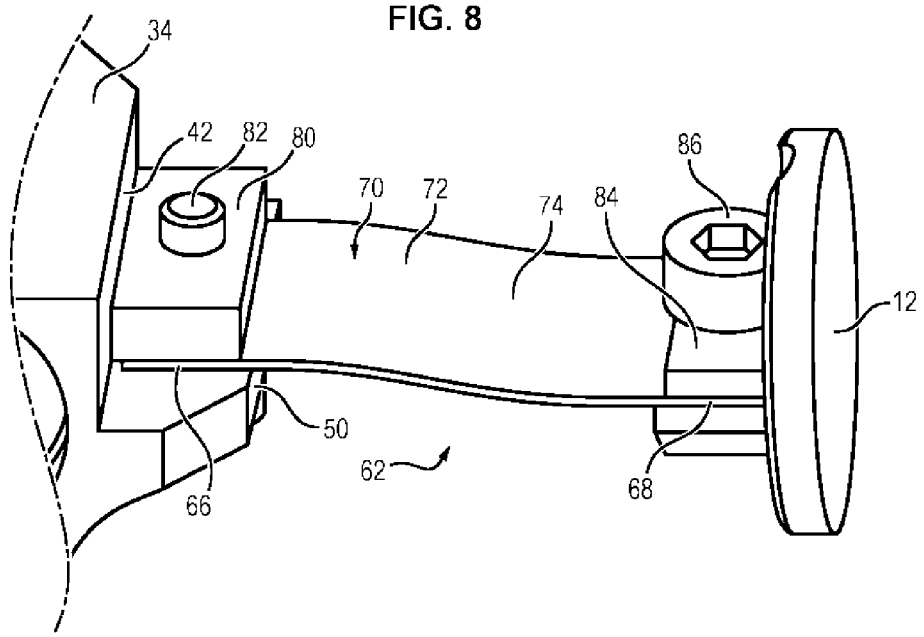
FIG. 8 is a perspective view of the first deformable element represented in FIGS. 6 and 7 and other parts of the cooling device in which this deformable element is embedded.

With reference to FIG. 8, for embedding the first deformable element 66 in the coupling member 34, the first orifice 76 is aligned with an orifice formed in an element of the coupling member protruding from the first wall toward the compression piston 12. A wedge 80 having another orifice is positioned so that its orifice is aligned with the orifices, and so that the first end portion 76 is sandwiched between the protruding element and the wedge. A screw-nut system 82 is used to embed the first portion of the first deformable element 62 in the coupling member 34. This system comprises a screw which has passed through the three orifices. The nut cooperates with the screw so as to hold the latter across the three orifices.

Similarly, the second orifice 78 is aligned with an orifice in an element protruding from the compression piston 12 toward the first wall of the coupling member 34. A wedge 84 having another orifice is positioned so that its orifice is aligned with the orifices, and so that the second end portion 68 is sandwiched between the protruding element of the piston 12 and the wedge 84. A screw-nut system 86 is used to embed the second end portion of the first deformable element 62 in the coupling member 34. This system comprises a screw which has passed through the three orifices. The nut cooperates with the screw so as to hold the latter across the three orifices.

The first deformable element 62 is for example made of multi-size blue sheet metal. This denomination, known to those skilled in the art, includes in particular the non-alloy structural steel XC70. This steel has the advantage of having a good yield resistance (about 1080 MPa) useful for the mechanical strength of the first deformable element 62.

The multi-size blue sheet metal has the advantage of having very high yield strength, as well as an excellent fatigue limit, while having a low Young's modulus so as not to require too much force during its deformation. The use of such a material to produce the first deformable element 62 is therefore particularly advantageous.

For example, the first deformable element 62 has a thickness of 0.25 millimeters, a length of 15 millimeters, and a width of 6.25 millimeters.

Furthermore, the Young's modulus of the first deformable element 62 along the compression axis is preferably of 210,000 MPa.

The first deformable element is typically manufactured by chemical cutting.

Figure 9:
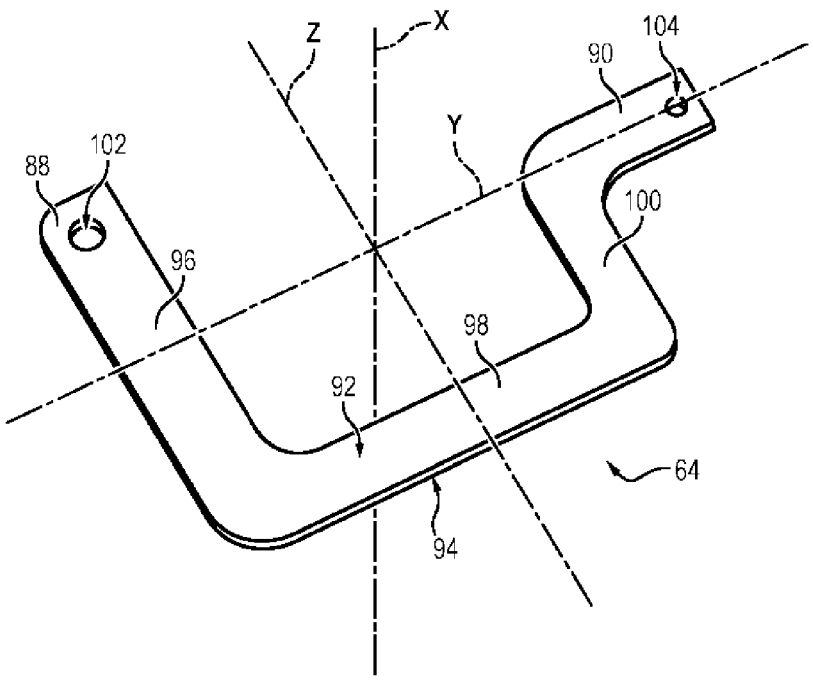
FIG. 9 is a perspective view of a second deformable element of the cooling device according to the first embodiment.

With reference to FIG. 9, the second deformable element 64 has a first end portion 88 embedded in the coupling member 34, and a second end portion 90 opposite the first end 88, embedded in the regenerator piston 16.

The second deformable element 64 has two opposite faces 92, 94, the thickness of the deformable element 64, measured perpendicular to the two faces 92, 94 is small compared to its length and its width.

The second deformable element 64 is embedded in the regenerator piston 16 and in the coupling member 34 so that there is at least one position of the coupling member 34 relative to the casing 22, during a turn of the crank 28, wherein the second deformable element 64 is in an undeformed configuration.

More specifically, the second deformable element 64 is embedded in the regenerator piston 16 and in the outer surface of the coupling member 34 in positions adapted so that the deformable element can be traversed over its entire length by the plane formed by the drive axis and the regeneration axis (thus flexurally undeformed) when:

The crankpin 32 occupies a position closest to the regenerator piston 16 during a turn of the crank 28, The crankpin 32 occupies a position farthest from the regenerator piston 16 during a turn of the crank 28.

The second deformable element 64 is of a flexibility adapted to allow it to adopt an S-shaped profile in a plane perpendicular to the drive axis Z, when the axis of the crankpin 32 is not in the plane defined by the drive axis Z and the regeneration axis Y.

Nevertheless, the second deformable element 64 has an axial stiffness (measured parallel to the regeneration axis Y) which is adapted to allow it to transmit a reciprocating translational movement of the crankpin 32 to the regenerator piston 16, even when it is deformed and when he has this S-shape.

The second deformable element 64 is for example made of the same material as the other deformable element, and for the same reasons.

The second deformable element 64 is for example produced by chemical cutting. This method has the advantage of being inexpensive and particularly adapted to the thin and relatively fragile parts.

The second deformable element 64 is a sheet metal.

For example, the second deformable element 64 has a thickness of 0.25 millimeters, a length of 15 millimeters, and a width of 6.25 millimeters.

Moreover, the Young's modulus of the deformable element along the compression axis is preferably of 210,000 MPa.

However, the shape of the second deformable element 64 is different from that of the first deformable element 62, and the location of embedding of the second deformable element 64 in the coupling member 34 is also different from that of the first deformable element 62.

It is only to the fourth edge 56 of the coupling member 34 that the first end portion of the deformable element is fastened. Particularly, the deformable element is not fastened to the third edge 54 facing the regenerator piston 16.

The second deformable element 64 has a shape adapted to bypass the coupling member 34 and the crankpin 32.

In addition, the two opposite faces 92 and 94 are not rectangular.

The second deformable element 64 presents the following portions (in addition to its two end portions 88, 90):
- a first intermediate portion 96 lengthening the first end portion 88, the first intermediate portion 96 extending facing the fourth edge 56, parallel to the drive axis Z,
- a second intermediate portion 98 lengthening the first intermediate portion 96, facing the sixth edge 60, and extending toward the regenerator piston 16, parallel to the regeneration axis Y,
- a third intermediate portion 100 lengthening the second intermediate portion 98 and extending parallel to the drive axis Z, so that the three portions 96, 98, 100 together form a U overlapping the coupling member 34.

Due to the fact that the second intermediate portion 98 is arranged facing the sixth edge 60, the coupling member 34 is located between the second portion and the drive shaft 30. The bypassing of the coupling member 34 by the deformable element is thus facilitated since this deformable element is not hindered by the drive shaft 30 during a turn of the crank 28.

The second deformable element 64 comprises, at the junction between the portions 96 and 98, a fillet and/or a rounding.

The second deformable element 64 further comprises, at the junction between the portions 98 and 100, a fillet and/or a rounding.

The second deformable element 64 furthermore comprises, at the junction between the portions 100 and 90, a fillet and/or a rounding.

Each rounding or fillet has the effect of avoiding the stress concentration in the second deformable element 64, when the latter is flexurally deformed. The first end portion 88 of the first deformable element 62 has an orifice 102, and the second end portion 90 has an orifice 104. The orifices 102, 104 each open into the two opposite faces 92 and 94.

Figure 10:
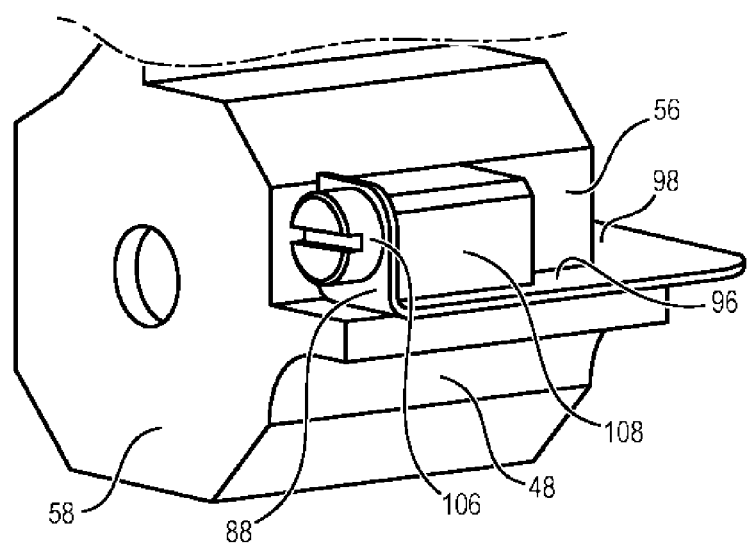
FIG. 10 is a partial perspective view of the second deformable element represented in FIG. 9 and of a coupling member of the cooling device of FIG. 5.
Figure 11:
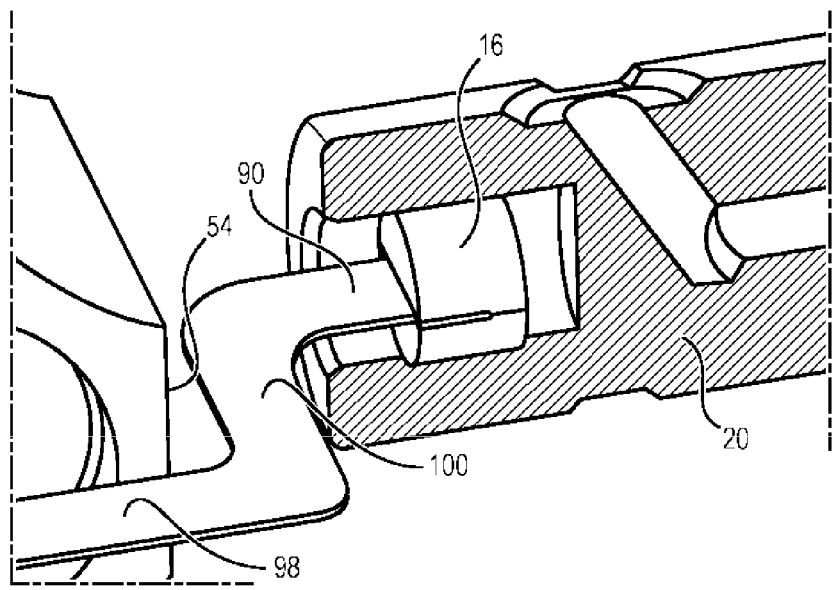
FIG. 11 is a partial sectional perspective view of the second deformable element represented in FIG. 9 and of a piston of the cooling device of FIG. 5.

Referring to FIG. 10, for embedding the second deformable element 68 in the coupling member 34, the first orifice 102 may be aligned with a nut 108 formed in an element of the coupling member protruding from the fourth wall 48. This nut is formed by a hole tapped in this element. A screw 106 is passed through the orifice 102 and the nut 108 aligned with each other.

Preferably, the nut 108 and the screw 106 are arranged so that the screwing axis of the screw in the nut is parallel to the drive axis Z of the crank 28 and is oriented so that the screw can be screwed in the nut by means of a screwing tool introduced into the access passage 26 at the central cavity 24. Such an arrangement makes it easier to disassemble and replace the second deformable element 64. For example, the first end portion 88 is bent at 90 degrees relative to the intermediate portion 96. Of course, other means for embedding the second deformable element 68 in the coupling member 34 can be used instead of the orifice 10 and of a screw-nut system.

Furthermore, the second intermediate portion is inserted into a gap formed between the element in which the nut is formed and another element protruding from the fourth wall of the coupling member 34, as represented in FIG. 10.

The second orifice 104 of the second deformable element is also engaged in a groove formed in the regenerator piston 16, so that this orifice 104 is arranged between and aligned with two transverse orifices opening into the groove (typically of a 0.6 mm diameter). A pin is passed through the three aligned orifices, to embed the second deformable element 64 in the regenerator piston 16. Alternatively, other means for embedding the second deformable element 68 in the regenerator piston 16 can be used, for example by bonding, without resorting to a pin.

The means for displacing the pistons 12 and 16 are mounted in the cooling device 8 according to the following method.

Firstly, the second deformable element 64 is embedded in the regenerator piston 16, and the regenerator piston 16 is fastened to the regenerator 20, so as to form a first set of parts.

Secondly, the first deformable element 62 is embedded in the coupling member 34 and in the compression piston 12, so as to form a second set of parts.

Thirdly, the two sets of parts are assembled by embedding the second deformable element 64 in the coupling member 34.

Fourthly, the drive shaft 30 is inserted by the access passage 26 to the cavity 24 so that the crankpin 32 engages the coupling part 34.

The cooling device 8 operates in the following manner.

When the motor is energized, it drives in rotation the drive shaft 30 of the crank 28 about the axis Z. The crankpin 32 itself rotates about the axis Z, being secured to the drive shaft 30, in the same way that the coupling member 34 extends around the crankpin 30.

During a turn of the crank 28, the coupling member 34 moves simultaneously in translation and in rotation.

Firstly, the coupling member 34 drives with it the first deformable element 62, so that the latter moves the compression piston 12 in rectilinear translation along the axis X, while flexurally deforming.

Simultaneously, the coupling member 34 drives with it the second deformable element 64, so that the latter moves the regeneration piston 16 in rectilinear translation along the axis Y, while flexurally deforming. It should be noted that the second deformable element 64 is longer than if it were embedded in the first edge 50 of the coupling member 34, facing the regenerator piston 12. With this excess length, the deformable element 64 is slightly bent during a turn of the crank 28, which slows down its wear.

Simultaneously, the coupling member 32 drives with it the second deformable element 64, so that the latter moves the regeneration piston 16 in rectilinear translation along the axis Y, while flexurally deforming. It should be noted that the second deformable element 64 is longer than if it were embedded in the first edge 50 of the coupling member 34, facing the regenerator piston 12. With this excess length, the deformable element 64 is slightly bent during a turn of the crank 28, which slows down its wear.

Simultaneously, the coupling member undergoes a slight reciprocating rotational movement relative to the casing 22. This rotation is limited by the axial stiffness of the two deformable elements 62 and 64. Consequently, the edge 50 of the coupling member 34 is constantly facing the compression piston 12, and the edge 54 of the coupling member 34 is constantly facing the regenerator piston 16, during a turn of the crank 28.

Once a crank turn is completed, a thermal cycle of the cooling device 8 is completed.

In the first embodiment presented above, the one of the two deformable elements 62 and 64 whose U-shape bypasses the coupling member is advantageously the second deformable element 64 embedded in the regenerator piston, for the following reasons. As indicated above, this U-shape makes sure that the deformable element is slightly bent during a Stirling cycle. However, this U-shape is relatively fragile. Since the forces on the regenerator piston are lower than on the "hot" compression piston, it is preferable that it is the deformable element 64 that has such a U-shape.

Other embodiments of a cooling device can be considered.

Figure 12:
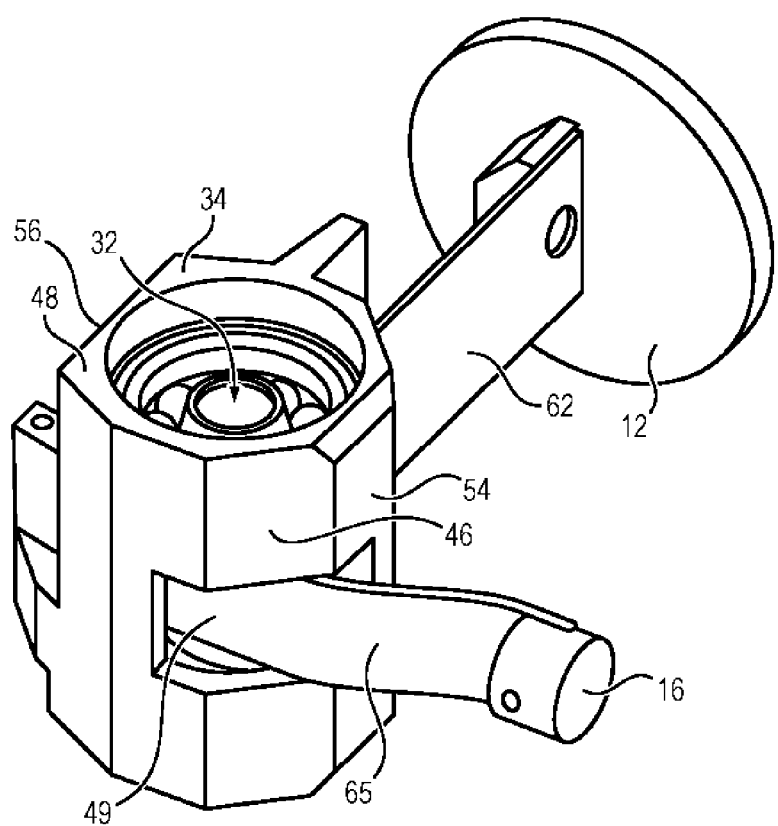
FIG. 12 is a perspective view of some parts of a cooling device according to a second embodiment of the invention.

FIG. 12 shows, for example, a second embodiment of a cooling device that differs from the first embodiment by that the second deformable element 64 bypassing the coupling member 34 is replaced with a deformable element 65 passing through the body of the cutting member 34. The second deformable element 65 extends in particular across a passage formed in the third wall 46 (the one closest and facing the regenerator piston 16, and in which the edge 54 is formed), and moreover across another passage formed in the fourth wall 48 opposite the wall 46 (and in which the edge 56 is formed).

Figure 13:
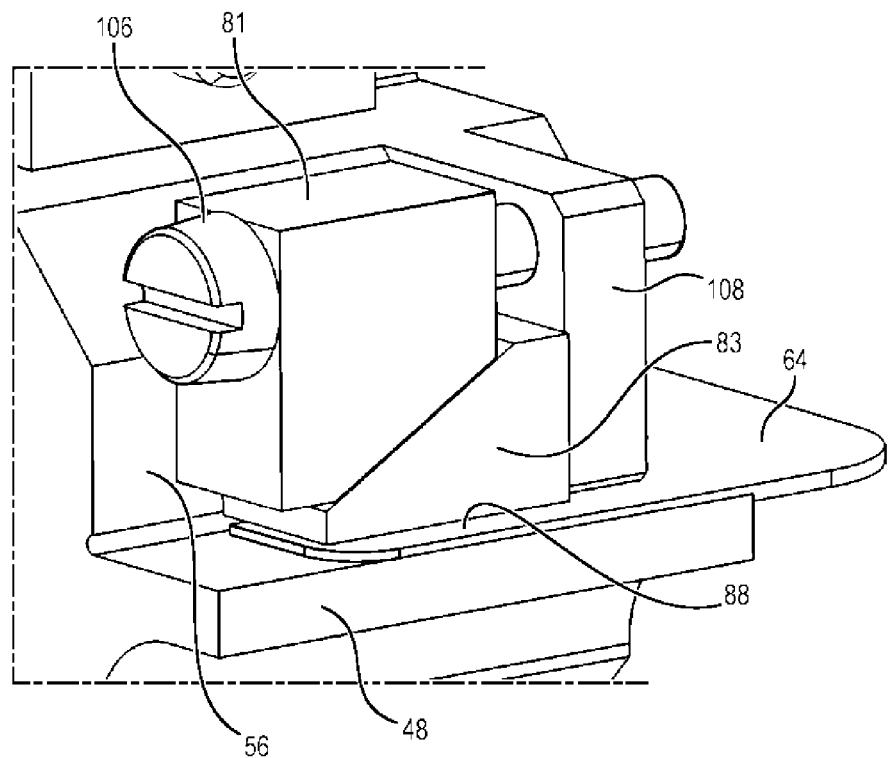
FIG. 13 is a perspective view of some parts of a cooling device according to a third embodiment of the invention.

FIG. 13 shows a third embodiment of a cooling device which differs from the first embodiment by the following characteristics relating to the embedding of the deformable element 64 in the coupling member 34. The end portion 88 of the deformable element 64 is not bent at 90 degrees relative to the rest of the deformable element 64. Furthermore, the wedge 80 is replaced with two wedge members 81, 83. The screw 106 passes through the first wedge element 81 then the nut 108 formed in the coupling member 34. The second wedge element 83 is arranged to rest against the end portion 88 of the deformable element 64. The two wedge elements 81 and 83 have shapes adapted so that a screwing of the screw parallel to the drive axis Z causes a biasing of the first wedge element 81 on the second wedge element along an axis perpendicular to the axis Z (and parallel to the axis X), and consequently a biasing of the second wedge element 83 against the end portion of the deformable element 64. Such a biasing can be obtained by giving the two wedge elements a tapered shape.

Moreover, the two deformable elements of each of the embodiments described above can be interchanged within the cooling device 8.

The invention claimed is:

1. The cooling device comprising:
a casing,
a crank movable in rotation relative to the casing,
a piston,
a coupling member mounted in rotation on the crank, the coupling member having a first edge facing the piston and a second edge opposite the first edge,
a deformable element embedded in the coupling member and embedded in the piston, the deformable element being configured to move the piston in translation relative to the casing while deforming, when the crank is rotated relative to the casing, the cooling device characterized in that the deformable element is embedded in the second edge of the coupling member, and in that the deformable element comprises:
a first portion extending along the second edge of the member parallel to an axis of rotation of the crank,
a second portion (98) lengthening the first portion and extending toward the piston,
a third portion lengthening the second portion and extending parallel to the axis of rotation of the crank, so that the three portions form a U overlapping the coupling member.

2. The cooling device according to claim 1, wherein the deformable element has a shape adapted to bypass the coupling member without touching the first edge during the rotation of the crank relative to the casing.

3. The cooling device according to any claim 1, wherein the piston is movable in translation along axis of translation coplanar with the axis of rotation of the crank.

4. The cooling device according to claim 1, wherein
the crank comprises a drive shaft and a crankpin that is eccentric relative to the drive shaft,
the coupling member is mounted in rotation on the crankpin, and is located between the second portion the deformable element and the drive shaft.

5. The cooling device according to claim 1, wherein the deformable element has a rounding and/or a fillet in at least one junction between two of the portions.

6. The cooling device according to claim 1, wherein the crank comprises a crankpin, and wherein the coupling member comprises a first wall in which the first edge is formed, and a second wall in which the second edge is formed, the crankpin being arranged between the first and second walls.

7. The cooling device according to claim 1, wherein the deformable element is made of metal.

8. The cooling device according to any of the preceding claims, wherein the deformable element is a sheet metal.

9. The cooling device according to claim 1, wherein:
the deformable element comprises an end portion having a first orifice,
the piston has a groove for receiving the end portion, two orifices opening into the groove and arranged to be aligned with the first orifice, and a pin passed through the three aligned orifices to embed the deformable element in the piston.

10. The cooling device according to claim 1, comprising
a nut formed in the coupling member,
a screw adapted to cooperate with the deformable element and the nut so as to embed the deformable element in the coupling member.

11. The cooling device according to claim 10, wherein
the casing defines a cavity housing the coupling member, and further has an access passage to the cavity,
the nut is oriented facing the access passage so that the screw can be screwed into the nut by means of a screwing tool introduced into the cavity via the access passage.

12. The cooling device according to claim 1, wherein the cooling device is an alpha type Stirling cooling device, and wherein the piston (16) is a cold piston of the cooling device (8).

13. The cooling device according to claim 1, further comprising:
a second piston,
a second deformable element embedded in the coupling member and embedded in the second piston, the second deformable element being configured to move the second piston in translation relative to the casing while deforming, when the crank is rotated relative to the casing.

14. The cooling device according to claim 13, wherein the coupling member also has a third edge facing the second piston, and wherein the second deformable element is embedded in the third edge of the coupling member.

15. The cooling device according to claim 13, wherein the cooling device is an alpha type Stirling cooling device, and wherein the second piston is a hot piston of the cooling device.

16. An infrared vision device comprising a cooling device according to claim 1.

* * * * *